(12) United States Patent
Liu et al.

(10) Patent No.: US 11,756,068 B2
(45) Date of Patent: Sep. 12, 2023

(54) SYSTEMS AND METHODS FOR PROVIDING INTERACTION WITH ELECTRONIC BILLBOARDS

(71) Applicant: SPECTRIO LLC, Tampa, FL (US)

(72) Inventors: Nanxi Liu, Los Angeles, CA (US);
David Zhu, Los Angeles, CA (US);
David A. Ross, Los Angeles, CA (US);
Zach Spitulski, Los Angeles, CA (US);
Navdeep Reddy, Los Angeles, CA (US)

(73) Assignee: SPECTRIO LLC, Tampa, FL (US)

( * ) Notice: Subject to any disclaimer, the term of this patent is extended or adjusted under 35 U.S.C. 154(b) by 671 days.

(21) Appl. No.: 13/962,946

(22) Filed: Aug. 8, 2013

(65) Prior Publication Data

US 2015/0046269 A1 Feb. 12, 2015

(51) Int. Cl.
*G06Q 30/00* (2023.01)
*G06Q 30/0241* (2023.01)
*G06F 3/14* (2006.01)
*G06Q 30/0273* (2023.01)
*G09G 5/00* (2006.01)

(52) U.S. Cl.
CPC ........... *G06Q 30/0241* (2013.01); *G06F 3/14* (2013.01); *G06Q 30/0275* (2013.01); *G09G 5/00* (2013.01)

(58) Field of Classification Search
CPC ........... G06Q 30/0276; G06Q 30/0241; G06Q 30/0275; G09G 5/00
USPC ............................... 705/14.66, 14.71, 14.46
See application file for complete search history.

(56) References Cited

U.S. PATENT DOCUMENTS

| 8,311,950 B1 * | 11/2012 | Kunal ............... G06Q 30/0201 705/319 |
| 8,615,565 B2 | 12/2013 | Randall |
| 2003/0135460 A1 * | 7/2003 | Talegon ............... G06Q 20/102 705/40 |

(Continued)

OTHER PUBLICATIONS

The Enplug Blog, Enplug Intelligent TV is in StartEngine's Office Lobby! (Jul. 9, 2012) (Archived at http://web.archive.org/web/20121014012439/http://enplug.com/blog/?p=89).*

(Continued)

*Primary Examiner* — Sun M Li
(74) *Attorney, Agent, or Firm* — Shumaker, Loop & Kendrick, LLP; James D. Miller

(57) ABSTRACT

Systems and methods deliver advertisements to electronic billboards, additionally deliver social media content relevant to the advertisements, control content of the electronic billboards, including through social media interactions, and deliver interactive applications to the electronic billboards and control the interactive applications. An advertisement is delivered to an electronic billboard for display, and social media content relevant to the advertisement is also delivered to the electronic billboard for display in real time. The social media content is used to update the display of the electronic billboard in temporal proximity to a time of posting of social media content. Content and applications are received at the electronic billboard by push, and may be removed from storage of electronic billboard after display to make storage room available for additional interactive applications and to ensure that updated content is always displayed.

6 Claims, 6 Drawing Sheets

(56) References Cited

U.S. PATENT DOCUMENTS

| | | | | |
|---|---|---|---|---|
| 2010/0257054 | A1* | 10/2010 | Martin | G06Q 30/02 705/14.46 |
| 2012/0143695 | A1* | 6/2012 | Nandagopal | G06Q 30/0251 705/14.66 |
| 2013/0254231 | A1* | 9/2013 | Decker | G06F 16/24573 707/770 |
| 2014/0229541 | A1* | 8/2014 | Dilio | B62B 3/0618 709/204 |

OTHER PUBLICATIONS

Enplug on Twitter: "Check it out @StartEngineLA ! Your tweet showed up on our interactive @Enplug TV screen!" (Posted 9:15 PM—Jul. 2, 2012).*
Michael Carney, StartEngine's Summer 2012 Demo Day Was Its Best Yet (Year: 2012).*
Enplug on Twitter: "Check it out @StartEngineLA! Your tweet showed up on our interactive @Enplug TV screen!" (Posted 9:15 PM—Jul. 2, 2012)] (Year: 2012).*
The Enplug Blog, Enplug Intelligent TV is in StartEngine's Office Lobby! (Jul. 9, 2012) (Year: 2012).*
Wikipedia, Display advertising (Year: 2018).*
An Introduction to Enplug, slide 9, May 31, 2011 (Year: 2011).*
Samantha Smith, LA Startup Goes from 0 to 100mph in Three Months, Aug. 13, 2012 (Year: 2012).*
Kool as Nerdz blog, Interview with Nanxi Liu. Aug. 7, 2013 (Year: 2013).*
Wikipedia,Enplug, available at: https://en.wikipedia.org/wiki/Enplug (Year: 2019).*
Interactive Wireless Electronic Billboard by Te-Kai Liu Yun-Wu Huang JewYao Cbun, Proceedings of the 2004 IEEE international Conference an Networking, Sensing E Control Taipei, Taiwan, Mar. 21-23, 2004 (Year: 2004).*
A technique to display advertisements on digital billboards based on the interests of people within viewing range of the billboard, Authors et. al.: Disclosed Anonymously IP.com No. IPCOM000240058D IP.com Electronic Publication Date: Dec. 29, 2014 (Year: 2014).*
Video available at https://vimeo.com/23828318.
Printout of archive.org archived "About Us" website from www.enplug.com/static/about-us dated May 21, 2012.
Printout of archive.org archived the Enplug Blog dating from Aug. 2012 and previously, from www.enplug.com/blog/ archived on Oct. 14, 2012.
Printout of DailyDOOH article: "enplug: A Startup With Big Dreams" dated Jan. 17, 2012, available at http://www.dailydooh.com/archives/60815 (retrieved Jan. 24, 2020).
"Enplug Intelligent Marketing" brochure dated Jul. 31, 2012.
Enplug Spec-sheet Working dated Feb. 4, 2011.
Printout of archive.org archived the Enplug website from www.enplug.com/ dated Jun. 3, 2012.
Enplug statement of work.
Enplug "Preliminary Functional Specification Document" undated.
Printout of archive.org archived the "Why Enplug" entry from www.enplug.com/why-enplug dated May 21, 2012.
Document headed "Venues (Growing Enplug Network)".
Document titled "Enplug Weldome to the Enplug Network!".
Document headed "Please edit parts in red".
Document titled "Enplug Intelligent Media".
Document titled "Introducing Enplug".
Document titled "Enplug Intelligent Advertising".
Document titled "Enplug Interactive Billboards".

* cited by examiner

SYSTEMS AND METHODS FOR PROVIDING INTERACTION WITH ELECTRONIC BILLBOARDS

BACKGROUND OF THE INVENTION

1. Field of the Invention

The present invention relates to electronic billboards, and more particularly to systems and methods for providing interaction with electronic billboards.

2. Background and Related Art

Traditionally, signage for businesses and others was static in nature and was relatively expensive and time-consuming to change. Recently, electronic signage such as electronic billboards has begun replacing static signage. Electronic signage can range in size from small personal displays such as iPads and other tablet devices used as restaurant menus and ordering devices, to HDTV televisions and computer monitors/displays used for localized signage, to extremely large displays in public locations like roadside signs, the multitude of displays at Times Square, and the like. For purposes of this application, all such electronic signage may be encompassed in the term "electronic billboards." One common characteristic distinguishing electronic billboards as understood herein from other types of personal devices (e.g. televisions, monitors, or tablet devices for personal use) is that the content displayed or available on electronic billboards is typically provided and/or ultimately controlled by an electronic billboard owner. While electronic billboards can encompass small devices, many electronic billboards have a diagonal measurement larger than a typical tablet device, or over approximately ten inches.

Electronic billboards permit businesses and others to display changing signage that can change at nearly a moment's notice and at comparatively little cost. Thus, a restaurant using an electronic billboard to display menu information can easily change menu items, prices, specials, and other information displayed on the electronic billboard. Additionally, such electronic billboards can be temporarily used to display advertisements from time to time. The displayed advertisements or other information may be static in nature, or it may incorporate motion and/or video. In some instances, electronic billboards or associated equipment may play audio to accompany the display on the electronic billboards. In other instances, no audio is associated with electronic billboards. Electronic billboards may be capable of displaying a large range of colors, or they may be limited to displaying a limited number of colors, and electronic billboards may have varying resolutions.

One limitation of electronic billboards is the limited amount of interaction that may occur between the viewers of electronic billboards and the billboards themselves or the owners of the content displayed on the billboards. In many situations, the interaction is limited to having the viewer view the display of the electronic billboard or read information displayed thereon. In some situations, such as where a touch-enabled electronic billboard is used or where a user input device is provided, the user may be able to navigate to view and/or read additional information or displays capable of being displayed by the electronic billboard. For example, for an electronic billboard used as a menu, the viewer might be able to provide an input to see additional information about menu items or to see more menu items. Generally, this type of interaction is the full extent of the currently available limited interaction between electronic billboards and viewers.

BRIEF SUMMARY OF THE INVENTION

Implementation of the invention provides systems, methods, and computer-readable media for executing methods for delivering advertisements to electronic billboards, for additionally delivering social media content relevant to the advertisements, for controlling content of the electronic billboards, including through social media interactions, and for delivering interactive applications to the electronic billboards and controlling the interactive applications.

A method for delivering an advertisement to an electronic billboard with social media content relevant to the advertisement includes delivering an advertisement to an electronic billboard for display, monitoring a social media source for social media content relevant to the advertisement or a location of the electronic billboard, retrieving social media content relevant to the advertisement from the social media source, and delivering the retrieved social media content relevant to the advertisement to the electronic billboard for display. The retrieved social media content may be provided to the electronic billboard for display in temporal proximity to a time of posting of the retrieved social media content at the social media source.

The advertisement may be scheduled for display during a display period, and the retrieved social media content may be social media content posted during the display period. The display period may be scheduled by an advertiser at a time of the advertiser's choosing, from days to mere minutes or seconds before the display period starts. The advertiser may schedule the display period by bidding on display of the advertisement during the display period. The advertiser may choose to bid against other advertisers for a display spot/time or can secure a display spot in advance, for example by paying a premium price for the display spot/time.

The electronic billboard displays the retrieved social media with the advertisement in real time. Monitoring a social media source for social media content relevant to the advertisement may include monitoring a plurality of social media sources for relevant social media content. The advertisement may be displayed in an advertisement content area of the electronic billboard and the social media content relevant to the advertisement may be displayed in a social media content area of the electronic billboard.

A method for controlling content on an electronic billboard using public social media interactions includes monitoring a social media source for social media content relevant to a display or location of an electronic billboard, retrieving social media content relevant to the display from the social media source, and using the retrieved social media content relevant to the display to update the display of the electronic billboard in temporal proximity to a time of posting of the retrieved social media content at the social media source. The method may also include curating the social media content, filtering it for offensive, inappropriate, or inapplicable content, and the like before or after using the retrieved social media content to update the display of the electronic billboard.

The display of the electronic billboard may be updated in real time with the posting of the retrieved social media content at the social media source. Social media content of multiple viewers of the electronic billboard may be used to update the display of the electronic billboard. The retrieved social media content may cause the electronic billboard to display additional content separate from the retrieved social media content in an interactive fashion.

Using the retrieved social media content to update the display of the electronic billboard may include displaying the retrieved social media content on the electronic billboard. Advertiser responses to the retrieved social media content may be displayed by the electronic billboard in real time as an advertiser conversation with the social media content. The social media source may be a social media source such as Twitter, Instagram, and Foursquare.

A method for delivering interactive applications to a public electronic billboard includes receiving a push of an interactive application at a public electronic billboard, displaying the interactive application using the public electronic billboard, displaying viewer interactions with the interactive application using the public electronic billboard, ceasing display of the interactive application after a display time has passed, and removing the interactive application from the public electronic billboard to make storage room available for additional interactive applications.

When instructions are received to remove a viewer interaction from being displayed by the public electronic billboard, the viewer interaction is removed from being displayed by the public electronic billboard. The interactive application may be received at the public electronic billboard over a network. The public electronic billboard may include a local control device that receives and stores the interactive application.

When a modification of the interactive application is received during the display time, the display of the interactive application is modified while the interactive application is being displayed. The public electronic billboard may receive information to be displayed by the public electronic billboard in temporal proximity to the time in which such information is to be displayed.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
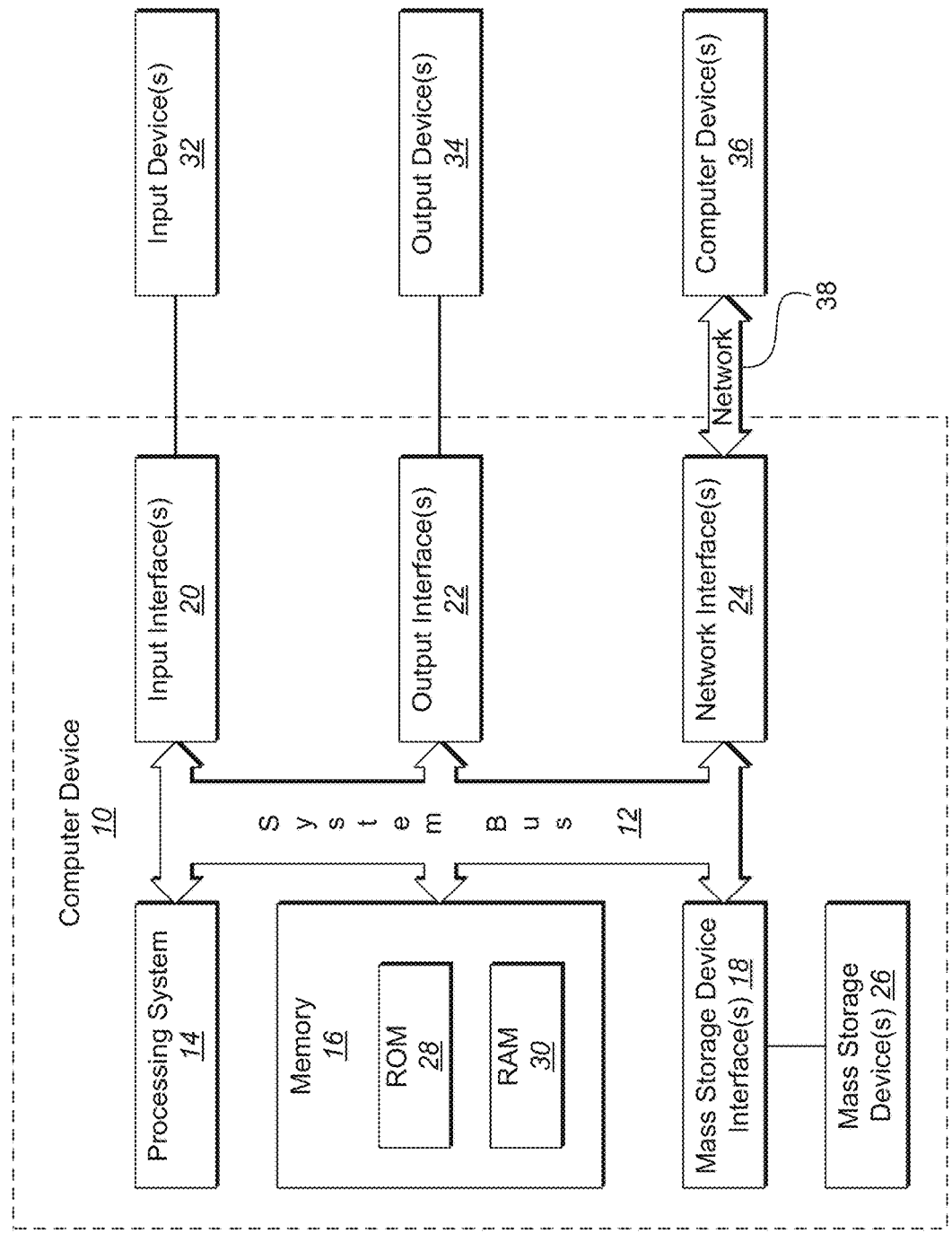
FIG. 1 shows a representative computer system suitable for use with embodiments of the invention.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide systems, methods, and computer-readable media for executing methods for delivering advertisements to electronic billboards, for additionally delivering social media content relevant to the advertisements, for controlling content of the electronic billboards, including through social media interactions, and for delivering interactive applications to the electronic billboards and controlling the interactive applications.

A method for delivering an advertisement to an electronic billboard with social media content relevant to the advertisement includes delivering an advertisement to an electronic billboard for display, monitoring a social media source for social media content relevant to the advertisement or a location of the electronic billboard, retrieving social media content relevant to the advertisement from the social media source, and delivering the retrieved social media content relevant to the advertisement to the electronic billboard for display. The retrieved social media content may be provided to the electronic billboard for display in temporal proximity to a time of posting of the retrieved social media content at the social media source.

The advertisement may be scheduled for display during a display period, and the retrieved social media content may be social media content posted during the display period. The display period may be scheduled by an advertiser at a time of the advertiser's choosing, from days to mere minutes or seconds before the display period starts. The advertiser may schedule the display period by bidding on display of the advertisement during the display period. The advertiser may choose to bid against other advertisers for a display spot/time or can secure a display spot in advance, for example by paying a premium price for the display spot/time.

The electronic billboard displays the retrieved social media with the advertisement in real time. Monitoring a social media source for social media content relevant to the advertisement may include monitoring a plurality of social media sources for relevant social media content. The advertisement may be displayed in an advertisement content area of the electronic billboard and the social media content relevant to the advertisement may be displayed in a social media content area of the electronic billboard.

A method for controlling content on an electronic billboard using public social media interactions includes monitoring a social media source for social media content relevant to a display or location of an electronic billboard, retrieving social media content relevant to the display from the social media source, and using the retrieved social media content relevant to the display to update the display of the electronic billboard in temporal proximity to a time of posting of the retrieved social media content at the social media source. The method may also include curating the social media content, filtering it for offensive, inappropriate, or inapplicable content, and the like before or after using the retrieved social media content to update the display of the electronic billboard.

For example, retrieved social media content for potential display on the electronic billboard can be curated according to standards set by advertisers whose advertisements are scheduled on the electronic billboard. For example, social media content that is critical of an advertiser can be filtered so as not to be displayed on the electronic billboard. Similarly, retrieved social media content for potential display on the electronic billboard can be curated according to standards set by the electronic billboard provider, including standards of decency, offensive language, and the like. As another alternative, retrieved social media content for potential display on the electronic billboard can be curated according to standards set by venue owners where the electronic billboard is located. For example, if a venue owner recognizes content that is disruptive to patrons, the venue owner can curate the content or ban the display of content from certain users who abuse the system.

The retrieved social media content can be curated at any time using a variety of systems and interfaces. For example, advertisers and venue owners can create standards and rules governing the display of retrieved social media content in advance using advertiser and venue owner web portals or other interfaces provided by the electronic billboard provider. Similarly, the electronic billboard provider can use its own systems to establish standards and rules governing the display of retrieved social media content in advance. Regardless of who establishes the rules or standards, such rules or standards may be established and varied according to any of a variety of criteria and factors, such as time of day, subject matter, location of the electronic billboard, advertisement displayed, and the like. Because prior-established rules and standards may not permit perfect filtration of retrieved social media content, social media content displayed on the electronic billboard may be curated after the fact by venue owners, advertisers, and the electronic billboard provider by similar means (e.g. web portal or other interface) and in real time.

The display of the electronic billboard may be updated in real time with the posting of the retrieved social media content at the social media source. Social media content of multiple viewers of the electronic billboard may be used to update the display of the electronic billboard. The retrieved social media content may cause the electronic billboard to display additional content separate from the retrieved social media content in an interactive fashion.

Using the retrieved social media content to update the display of the electronic billboard may include displaying the retrieved social media content on the electronic billboard. Advertiser responses to the retrieved social media content may be displayed by the electronic billboard in real time as an advertiser conversation with the social media content. The social media source may be a social media source such as Twitter, Instagram, and Foursquare.

A method for delivering interactive applications to a public electronic billboard includes receiving a push of an interactive application at a public electronic billboard, displaying the interactive application using the public electronic billboard, displaying viewer interactions with the interactive application using the public electronic billboard, ceasing display of the interactive application after a display time has passed, and removing the interactive application from the public electronic billboard to make storage room available for additional interactive applications.

When instructions are received to remove a viewer interaction from being displayed by the public electronic billboard, the viewer interaction is removed from being displayed by the public electronic billboard. The interactive application may be received at the public electronic billboard over a network. The public electronic billboard may include a local control device that receives and stores the interactive application.

When a modification of the interactive application is received during the display time, the display of the interactive application is modified while the interactive application is being displayed. The public electronic billboard may receive information to be displayed by the public electronic billboard in temporal proximity to the time in which such information is to be displayed.

For purposes of this application, "real time" and "real-time" encompass sufficient temporal proximity of two events such that the two events can meaningfully interact. Thus, for example, the real-time display of information posted to a social media site by an electronic billboard encompasses the display of the information by the electronic billboard within a few seconds to approximately ten to twenty seconds after the time that the information is posted to the social media site. Similarly, a real-time bidding process is one that receives, records, and distributes bids with sufficient rapidity to allow other bidders to increase their bids in an auction style. As another example, simulation of an electronic billboard display on a remote computer device encompasses sufficient temporal proximity to permit the simulation to accurately represent what is displayed by the electronic billboard and permit a remote viewer to interact with or otherwise change the display. Thus, while there is no specific hard rule defining "real time" or "real-time," these phrases are intended to encompass sufficient temporal proximity to permit meaningful user or viewer interaction between two events.

FIG. 1 and the corresponding discussion are intended to provide a general description of a suitable operating environment in which embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand alone electronic devices, and other such electronic environments.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

With reference to FIG. 1, a representative system for implementing embodiments of the invention includes computer device 10, which may be a general-purpose or special-purpose computer or any of a variety of consumer electronic devices. For example, computer device 10 may be a personal computer, a notebook or laptop computer, a netbook, a personal digital assistant ("PDA") or other hand-held device, a smart phone, a tablet computer, a workstation, a minicomputer, a mainframe, a supercomputer, a multi-processor system, a network computer, a processor-based consumer electronic device, a computer device integrated into or connected to another device such as an electronic billboard, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer-readable media, such as on memory 16, a magnetic hard disk, a removable magnetic disk, a magnetic cassette, an optical disk, or from a communication connection, which may also be viewed as a computer-readable medium.

Memory 16 includes one or more computer-readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer-readable medium. Mass storage devices 26 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
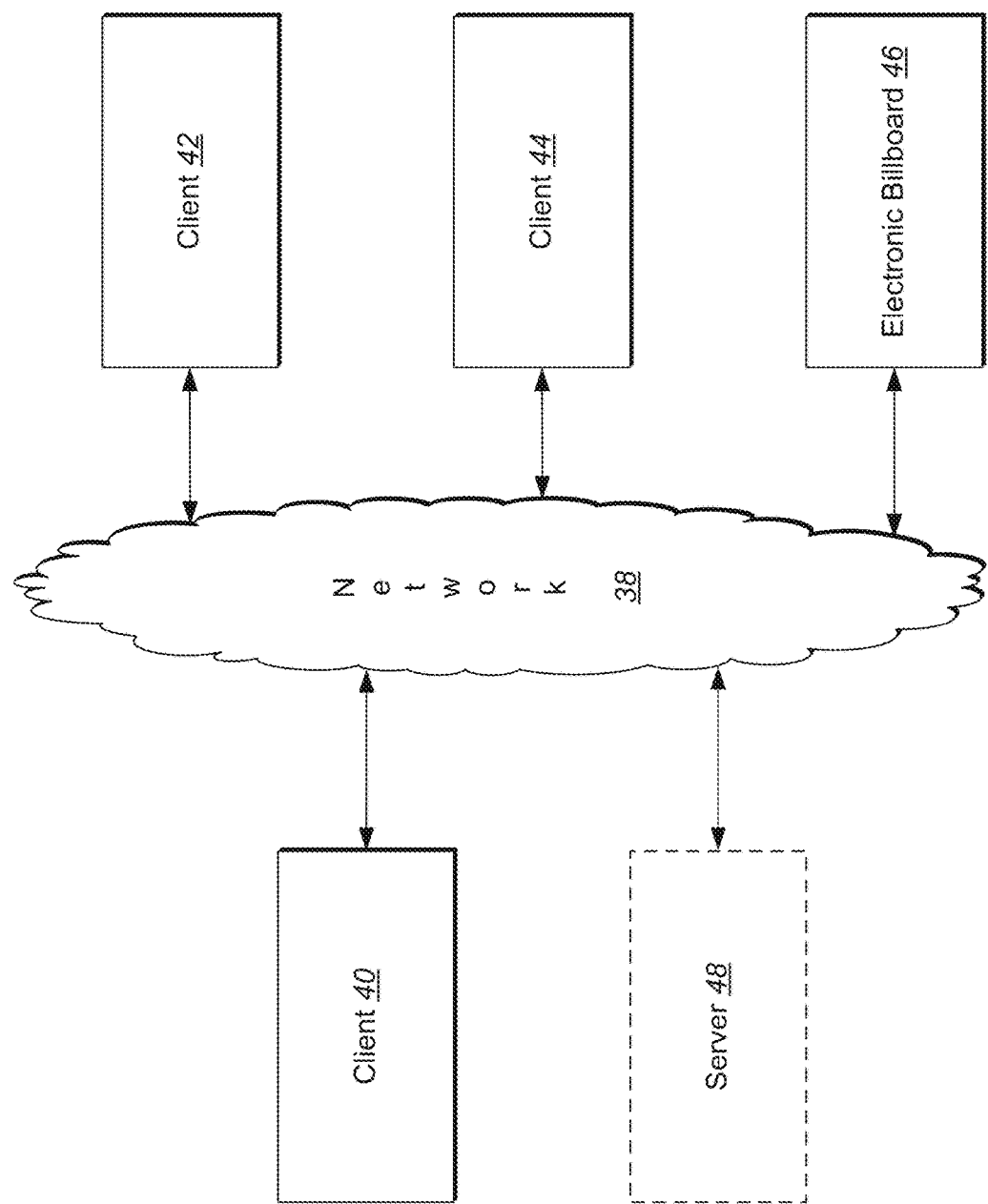
FIG. 2 shows a representative networked computer system suitable for use with embodiments of the invention.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to one or more other computer devices (illustrated as client 42 and client 44) and one or more electronic billboards 46 across network 38. While FIG. 2 illustrates an embodiment that includes a client 40, two additional clients, client 42 and client 44, one electronic billboard 46, and optionally a server 48, connected to network 38, alternative embodiments include more or fewer clients, more than one electronic billboard, no server 48, and/or more than one server 48 connected to network 38. Other embodiments of the present invention include local, networked, or peer-to-peer environments where one or more computer devices may be connected to one or more local or remote electronic billboards. Moreover, embodiments in accordance with the present invention also embrace a single electronic consumer device, wireless networked environments, and/or wide area networked environments, such as the Internet.

Similarly, embodiments of the invention embrace cloud-based architectures where one or more computer functions are performed by remote computer systems and devices at the request of a local computer device. Thus, returning to FIG. 2, the client 40 may be a computer device having a limited set of hardware and/or software resources. Because the client 40 is connected to the network 38, it may be able to access hardware and/or software resources provided across the network 38 by other computer devices and resources, such as client 42, client 44, server 48, or any other resources. The client 40 may access these resources through an access program, such as a web browser, and the results of any computer functions or resources may be delivered through the access program to the user of the client 40. In such configurations, the client 40 may be any type of computer device or electronic device discussed above or known to the world of cloud computing, including traditional desktop and laptop computers, smart phones and other smart devices, tablet computers, or any other device able to provide access to remote computing resources through an access program such as a browser.

Figure 3:
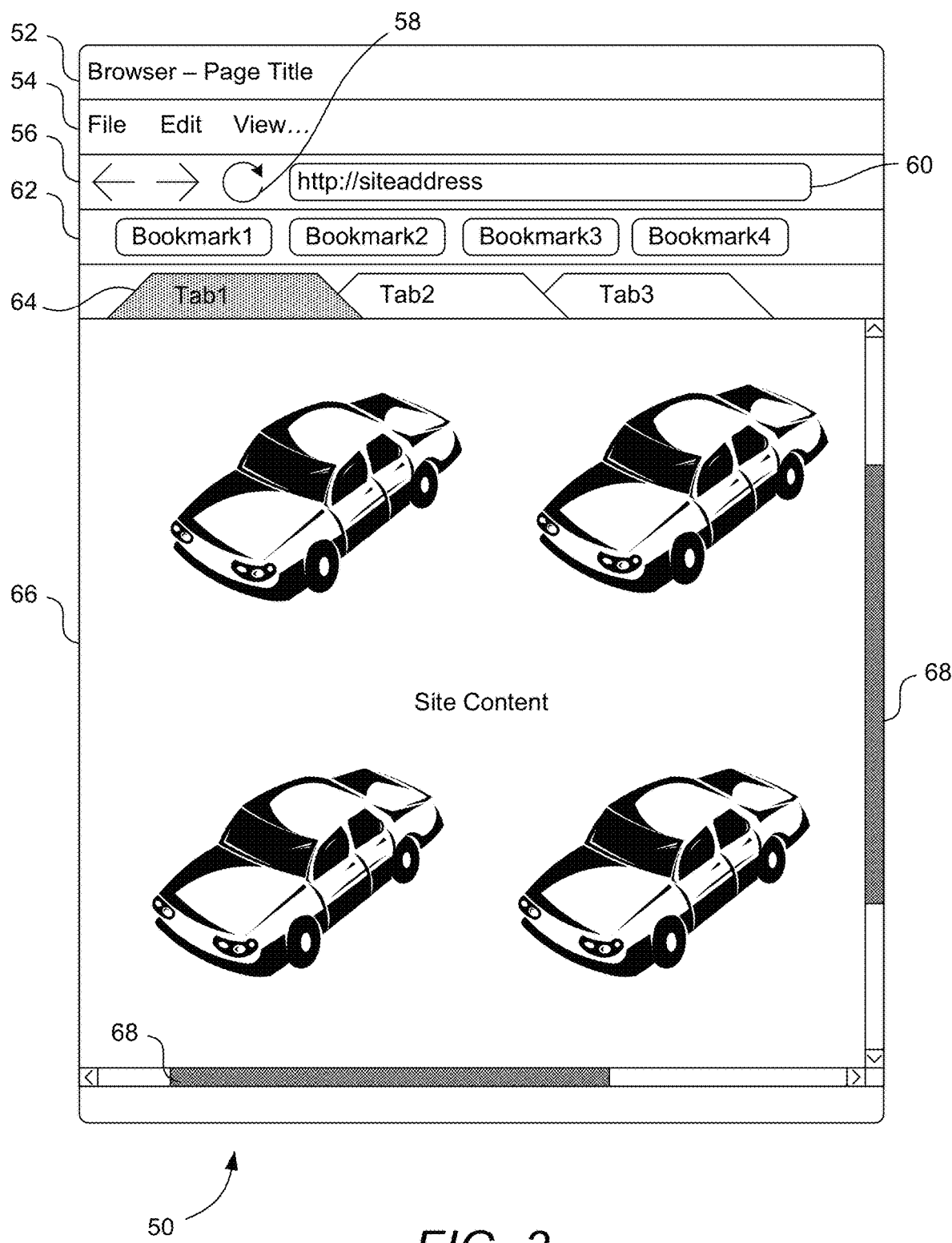
FIG. 3 shows a representative browser window for use with embodiments of the invention.

To minimize the need to download and/or install programs on users' computers and other devices, embodiments of the invention utilize existing web browser technology. Many browser programs currently exist or are under development, and it would be impossible to name all such browser programs, but examples of such programs include Microsoft's Internet Explorer, Mozilla Firefox, Google Chrome, Apple Safari, Opera Software's Opera browser, as well as a myriad of other browsers specifically configured for specific devices, such as Internet-connected smart phones and the like. While the exact display of each browser can vary from browser to browser and while most are moderately to highly configurable so as to vary the exact display, FIG. 3 shows a representative browser window 50 similar to what might be displayed on a user's computer device. It will be appreciated that many of the features described below with respect to the illustrated browser window 50 are optional or are optionally displayed or hidden as desired by the user, but each feature is typical or illustrative of features common to many browser programs.

The browser window 50 of FIG. 3 includes a title bar 52. The title bar 52 often is used to display a page name of whatever page is actively being viewed. Most commonly, the page name that is displayed is selected by the administrator of the website being viewed, and the page name often includes one or more phrases associated with the administrator of the website and/or the page being viewed. The browser window 50 also includes a menu bar 54 that includes items that may be selected to provide access to various menu functions, as is well known in the art. Of course, the menu functions provided in the menu bar 54 may vary according to the specific browser program, among other considerations, and access to menu functions may be provide other than by a menu bar similar to menu bar 54.

The browser window 50 of FIG. 3 also includes an address bar 56, which in the browser window 50 shown in FIG. 3 includes several browser controls 58 and an address entry area 60. The browser controls 58 and the address entry area 60 facilitate browsing using the window, permitting the user, for example, to go back one or more pages, to go forward one or more pages, to refresh a page, and/or to type in a destination site's address to directly access a page. Such browser features are well known in the art and need not be further discussed.

The browser window 50 also includes a bookmark bar 62 that a user can populate with bookmarks to commonly-accessed web pages, such that the user can quickly re-access the page(s) by clicking on the relevant bookmark button. In most common browser programs, it is possible for the user to have several different websites open simultaneously, and for the browser to provide rapid access, switching between, and management of the various open sites by way of various tabs 64, as shown in FIG. 3. Each tab 64 provides access to one open website. The tabs 64 facilitate navigation between different open websites. The contents of each open and actively-viewed website may be displayed in a content area 66. Thus, the content displayed in the content area 66 may vary depending on which tab 64 is selected, and which website is being viewed.

Whereas the tabs facilitate navigating between different websites, the browser window 50 optionally includes features to facilitate navigating within a website, as is known in the art. Specifically, the browser window may optionally include one or more scroll bars 68. When a portion of the website being viewed lies outside of the viewable portion of the content area 66, the user may use the scroll bars 68 to access non-visible portions, as is known in the art.

While features of embodiments of the invention may be accessed and/or provided using browsing technology, similar features may also be accessed and/or provided using specific applications or apps running on a computing device. For example, users of mobile devices such as smart phones commonly utilize one or more apps installed on the mobile devices to perform certain functions. As an example, mobile device users commonly interact with social media providers using apps installed on their mobile devices. Apps may also be installed or run through a variety of devices, such as on or through electronic billboards, as will be discussed in more detail below. Therefore, where features of embodiments of the invention are discussed as being provided by a computer device herein, it should be understood that the features may be provided through a dedicated app or application installed on the computer device, through a browser-accessible application, or through any other mechanism to provide access to computer-provided features.

Figure 4:
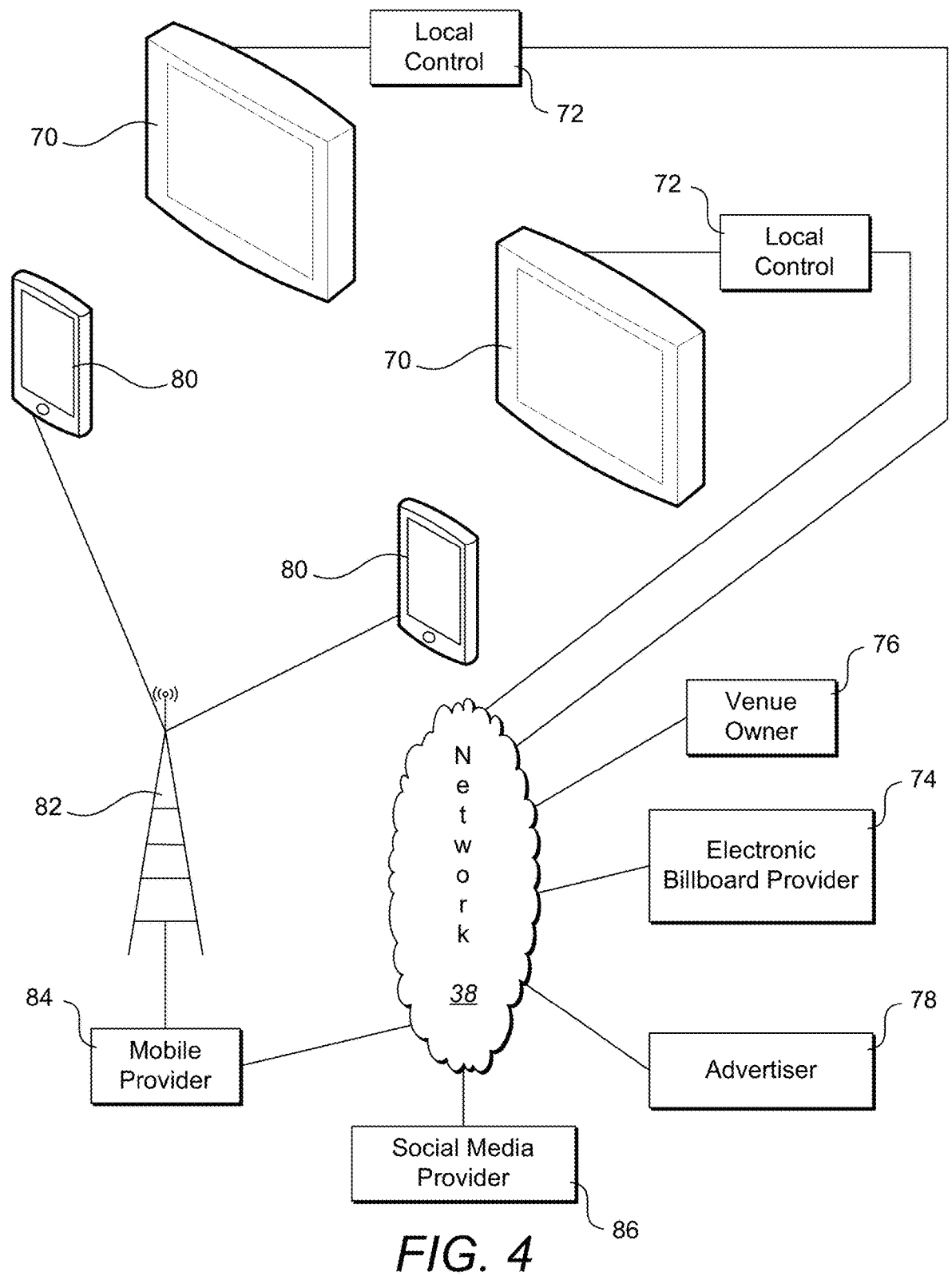
FIG. 4 shows a representative system providing interaction with electronic billboards.

To illustrate the functionality of embodiments of the invention, FIG. 4 illustrates a system configuration for use with embodiments of the invention. The system includes two electronic billboards 70. While two electronic billboards 70 are displayed in the system of FIG. 4 for illustration purposes only, it will be understood that systems in accordance with embodiments of the invention may include only a single electronic billboard 70 or more than two electronic billboards 70, including many electronic billboards 70. Therefore, the number of electronic billboards 70 shown in FIG. 4 is only for purposes of illustrating the features and components of embodiments of the invention.

Each electronic billboard 70 includes an electronically modifiable display area, which may be provided, for example, as part of a high-definition television screen of any applicable or desirable size. Each electronic billboard 70 may be located in a different location or venue, including locations or venues controlled by different venue owners. The electronic billboards 70 may each be chosen and sized to be appropriate for the intended venue or location. Each electronic billboard 70 is communicatively connected to a local control device 72. As one example, the local control device 72 is integrated into electronic billboard 70 and is able to control the functions thereof. Alternatively, the local control device 72 may be wirelessly connected to the electronic billboard. As another example, the local control device 72 may be connected to its electronic billboard 70 through an RS-232 serial port and connector, other wired connection, or the like. Where the local control device 72 is connected to its electronic billboard 70 through an RS-232 serial port or the like, the local control device 72 may control features of the electronic billboard 70, such as powering the electronic billboard on and off at hours corresponding to open hours of the venue of the electronic billboard 70, setting and maintaining the audio volume of the electronic billboard 70 to a desired level, setting and maintaining the source input of the electronic billboard 70, locking a button panel and/or on-screen display of the electronic billboard 70, and the like.

Regardless of the manner in which the electronic billboard 70 is communicatively connected to the local control device 72, the communication between the electronic billboard 70 and the local control device 72 may be bi-directional. For example, the electronic billboard 70 may be configured to pass signals received from a remote control such as an infrared remote control to the local control device 72. In such a fashion, the local control device 72 may be accessed and at least partially controlled via a remote control device at the electronic billboard 70. Thus, for example, if a system engineer or maintenance personnel is located at the electronic billboard 70 and wishes to perform systems diagnostics or programming, one potential option for accessing the local control device 72 is by using a remote control capable of communicating with the electronic billboard 70. In some embodiments, the remote control used may be a standard television remote control configured to operate the type of display (e.g. television) used for the electronic billboard 70.

Additionally, the local control devices 72 are at least intermittently connected to an electronic billboard provider 74 through the network 38. As discussed earlier, the network 38 may be or include any network components, including the Internet, local area networks, and proprietary networks. Because of the connection between the electronic billboard provider 74 and the local control devices 72, the electronic billboard provider 74 may utilize the network connection to monitor and control the local control devices 72. Software, hardware, and/or firmware operating on the local control devices 72 may be monitored and controlled using computing devices at or controlled by the electronic billboard provider 74 using signals sent over the network 38.

Each electronic billboard 70 and local control device 72 may exist as a live node in a distributed electronic billboard system. Each node may serve simultaneously as a client and a server, whereby the electronic billboard provider 74 may passively receive status updates from the local control 72 and electronic billboard 70 over the network and may also actively connect to and service the local control device 72 and electronic billboard 70 over the network. The electronic billboard provider 74 may interact with the local control device 72 and electronic billboard 70 at a root level, including managing the state of the hardware (e.g. on/off, input, volume, etc.). In some instances, for example, communication with the electronic billboard 70 may occur using a network protocol such as secure shell (SSH) protocols and the like. The use of such protocols may allow distribution of data and communications distributed over unsecured networks such as the Internet while ensuring integrity and confidentiality of such data and communications.

The electronic billboard provider 74 may passively receive significant amounts of information from the electronic billboards 70 and/or local control devices 72. For example, the electronic billboard provider 74 may receive information about the state of the electronic billboard hardware (e.g. on/off, volume, etc.), as well as information about what is currently being shown on the electronic billboard 70. This information may be used by the electronic billboard provider 74 for various purposes. For example, the electronic billboard provider 74 can use the information to monitor the health of the system and its individual components. For example, the electronic billboard 70 and/or local control device 72 may log and report any errors as well as the results of installation of upgrades, content, or any other information. Additionally, the electronic billboard provider 74 can use the information received from the local control devices 72 to provide accurate billing to advertisers advertising on the electronic billboards 70. For example, if an advertiser schedules an advertisement on a certain electronic billboard 70 at a certain time, but the electronic billboard 70 is off due to a power outage, the electronic billboard provider 74 would become aware that the advertisement was not run and would not bill the advertiser. The electronic billboard provider 74 can also use the information to generate metrics about how the electronic billboards 70 are being used and interacted with.

The local control devices 72 may also respond as a client to both active connections from servers of the electronic billboard provider 74 as well as to passive commands queued up on such servers. The response to active connections allows the electronic billboard provider 74 to execute commands on the local control devices 72 and electronic billboards 72, e.g. using SSH or similar protocols. The ability to respond to passive commands queued up on the servers is a fallback mechanism to permit execution of maintenance commands. The local control devices 72 may periodically search for and retrieve over the network 38 any queued-up passive commands on the servers.

The local control devices 72 may operate an automated background package management and update system. The background package management and update system may serve to keep any software packages up-to-date. The local control devices 72 may periodically check in with the electronic billboard provider's systems to determine which version of a certain package should be running on the electronic billboards 70. If the local control devices 72 need to install a new package, they download and install the new package, resolving any errors that occur and reporting the results of any upgrade back to the electronic billboard provider 74.

The electronic billboard provider 74 interacts with others to provide functionality through the electronic billboards 70. For example, an owner 76 of a venue where the electronic billboard 70 is located can access the electronic billboard 70 through systems or software of the electronic billboard provider 74, such as through a web portal or other interface. Such interaction may be provided using SSH or similar protocols, or using any other secure interface. Additionally, the electronic billboard provider 74 may interact with advertisers such as advertiser 78 to provide advertisements, including targeted advertisements and interactive advertisements, to the electronic billboards 70. Advertisers such as advertiser 78 may also similarly interact with electronic billboards 70, with venue owners 76, and with electronic billboard provider 74 using a variety of secure protocols and/or interfaces.

Advertisers such as advertiser 78 are provided with an opportunity to create, upload, and schedule advertisements to run on the network of electronic billboards 70. An uploaded advertisement may be scheduled to run on one or more electronic billboards immediately after upload or at a later time for a fixed amount of time and/or at specified intervals. The electronic billboard provider 74 may provide advertisers with a real-time bidding option for scheduling advertisements. In a real-time bidding process, advertisers are able to set the maximum they would be willing to pay for one of their advertisements to appear on a screen of a given electronic billboard 70 for a given amount of time at a given time. The bidding process can be specific to each individual electronic billboard 70. If an advertiser's maximum bid is the highest of all bidders for a particular time slot, then the advertiser's advertisement will run on the electronic billboard 70 with or without associated additional social media content, which will be described in more detail below.

With any scheduling mechanism, including the real-time bidding scheduling mechanism, advertisers target venues and their associated electronic billboards 70 either individually or based off of a set of demographic specifications of the actual customer base and/or foot traffic of that venue. Such demographic specifications may include average age, gender, cultural background, ethnicity, interests (e.g. sports, music, alcohol), etc. The advertisers may also take into consideration the best time of day for their type of advertisement (e.g. toys, housecleaning products, alcohol, etc.). The advertisers may also consider the average customer base and/or foot traffic of the venue at the specific day of the week and time.

For example, a particular venue may generally cater to families during the day but be more adult-oriented at night. Advertisers seeking to display advertisements to parents or children therefore might favor having their advertisements displayed at the venue during daytime hours to target families. Similarly, advertisers seeking to display advertisements for adult-oriented products or services might prefer to have their advertisements displayed at the venue during nighttime hours. In some instances, the venue owner 76 may be provided with an opportunity to interact with the electronic billboard provider 74 and limit the types of advertisements that can be displayed on electronic billboards 70 in the venue either entirely or at certain times. In some instances, the venue owner 76 may impose limits on advertisements in advance. In other instances, the venue owner 76 may impose limits on advertisements as they appear, such that as the venue owner 76 becomes aware of an undesirable advertisement, the venue owner 76 is able to access the system and prevent that advertisement from appearing again and/or to prevent similar advertisements from being displayed in the future. The electronic billboard provider 74, when providing advertisers opportunities to target their advertisements, accounts for the preferences of venue owners 76 and may limit the advertisers' ability to schedule, bid on, or otherwise seek display of certain advertisements at certain times.

A variety of real-time bidding processes may be used to schedule advertising on the electronic billboards 70. According to some real-time bidding processes, the bidding may continue up until the advertisement is to be displayed or shortly before the advertisement is to be displayed on the electronic billboards 70. Advertisers such as advertiser 78 may consider their advertising budget and the desirability of displaying advertisements at certain times on certain electronic billboards 70 as they bid in real time and seek to display their advertisements at desired times and locations and at desired prices. For example, a starting bid for displaying an advertisement on an electronic billboard 70 for fifteen seconds at a certain time might be one cent. Initial bidding for that time slot might be limited, but might increase in temporal proximity to the time slot. As bids are received from advertisers, the going price is updated in real time, and other advertisers can outbid previous bids.

Because advertisements can be delivered to the electronic billboards 70 in real time (e.g. by streaming the advertisements), bidding for each time slot can continue until the time slot or immediately before the time slot, thereby maximizing the value of each time slot.

Advertisers can also utilize tools and budgets to control their bidding for advertising. An advertiser, for example, might set a daily budget for advertising. The budget can be used to help determine how the advertiser's advertising dollars are spent. Additionally, any budget considerations can be considered in evaluating whether or not to bid for popular locations and times. Intelligent constraints may also be imposed to prevent advertisers from monopolizing a particular time period or electronic billboard 70. For example, if an advertiser successfully outbids other advertisers for a particular time slot on a particular electronic billboard 70, the system might prevent the advertiser from bidding on adjacent time slots within a certain amount of time on the same electronic billboard 70.

Any other considerations can be taken into account to maximize revenue from advertising, to maximize viewer interaction with the electronic billboards 70, to maximize variation of advertisements on the electronic billboard, or for any other desirable consideration. For example, if a certain advertisement were continuously displayed on a particular electronic billboard 70 for too long a time, viewers might become bored by the advertisement and viewer interaction and engagement with the electronic billboard 70 and the advertisement might drop. The system can take such considerations into account and can avoid scheduling conflicts to maintain viewer interest and maximize advertiser impressions by automatically avoiding situations where a single advertiser's advertisements are overly clustered. As an example, the system may monitor viewer interactions with a displayed advertisement as well as an amount of time scheduled for the advertisement, and can intelligently determine whether to terminate display of an advertisement prior to a scheduled termination time due to low viewer interaction, thus saving advertiser funds for later display of the advertisement or other advertisements. Analogously, the system can account for similarity in advertisements or advertising subject matter to avoid scheduling competing advertisements in close temporal proximity. Any other considerations may be adopted to enhance the experience for both advertisers and viewers.

Subject to any advertisement constraints, such as those imposed by the venue owners, the system may conduct real-time bidding in a way that simulates an auction room. The system queries for highest bids among internal bidders and external bidders provided by third-party sources. Once a high bidder is determined, the electronic billboard provider 74 retrieves the advertisement information and any associated social media information as discussed below, and delivers it immediately to the selected electronic billboard(s) 70 where the advertisement is supposed to be displayed. Once display of the advertisement at the electronic billboard 70 is confirmed, the system adds the amount of the winning bid to the bill of the winning advertiser.

The electronic billboard provider 74 may provide advertisers with certain tools to help them understand how their advertisements will appear. For example, while advertisers may often create their own advertisement content to be displayed on the electronic billboards 70, the electronic billboard provider 74 may provide an integrated advertisement building tool, such as a tool available through a web portal, that allows advertisers to see how their advertisements will appear on the selected electronic billboards 70.

Additionally, the tool may permit advertisers to create or modify the social media information that will be displayed with their advertisements. Advertisers may also be able to see in real time how their advertisements appear on any selected electronic billboards 70 by way of a web-based simulation as the advertisements are being displayed in real time.

The manner in which the advertisements are displayed on the electronic billboards 70 allows the advertisements to be made interactive. When the advertisements are made interactive, viewers of the advertisements on the electronic billboards 70 are able to utilize a device to interact with the advertisements. The interaction may occur through social media, and may therefore heighten the social media presence of the advertiser as the viewers of the advertisements interact with the advertisements on the electronic billboards 70. In the example of FIG. 4, the viewers of the advertisements on the respective electronic billboards 70 are able to interact with the advertisements using their mobile devices 80, which may be smart phones, cell phones, PDAs, tablet computers, laptops, notebooks, netbooks, and the like.

The viewers' mobile devices 70 are connected to the network 38 using the mobile devices' networking capabilities. As one example, the viewers' mobile devices 80 may be connected to the network 38 using a wired or wireless connection provided or available at the venue. As another example that is specifically illustrated in FIG. 4, the mobile devices 80 are communicatively connected through a cell site 82 operated by a mobile provider 84. The mobile devices 80 may be connected to the cell site 82 using any mobile communications protocol now available or later developed, including, for example, 3G and 4G mobile telecommunications technologies. Regardless of the technology used, the mobile provider 84 provides the mobile devices 80 with a communicative connection to the network 38 such that users of the mobile devices 80 may interact with other devices and services over the network.

As one example of such interaction, users of the mobile devices 80 may interact with a social media provider 86 over the network 38. The social media provider 86 may be any type of social media provider, including Twitter, Instagram, Foursquare, and the like. The users of the mobile devices 80 may interact with the social media provider 86 using a dedicated social media provider app on the mobile devices 80, through text message (SMS) or multimedia message (MMS) services, through browsers operating on the mobile devices 80, or using any other means or mechanism known in the art to permit users of mobile devices to interact with social media providers.

Embodiments of the invention utilize social media principles and information to provide additional features to viewers of the electronic billboards 70. In embodiments of the invention, relevant social media feeds can be displayed with advertisements on the electronic billboards 70. The social media feeds can be displayed with the advertisements in any relevant fashion. For example, the electronic billboards 70 may alternate between displaying relevant social media feeds and corresponding advertisements. Alternatively, the advertisements or a portion thereof may be overlaid with relevant social media feeds and information on the electronic billboards 70. The overlaying may be intelligently handled to ensure that relevant information of the advertisements is not covered by the display of the relevant social media feeds. As another alternative, a portion of the electronic billboards 70 may be dedicated to displaying the advertisements, and another portion of the electronic billboards 70 may be dedicated to displaying the relevant social media feeds.

Figure 5:
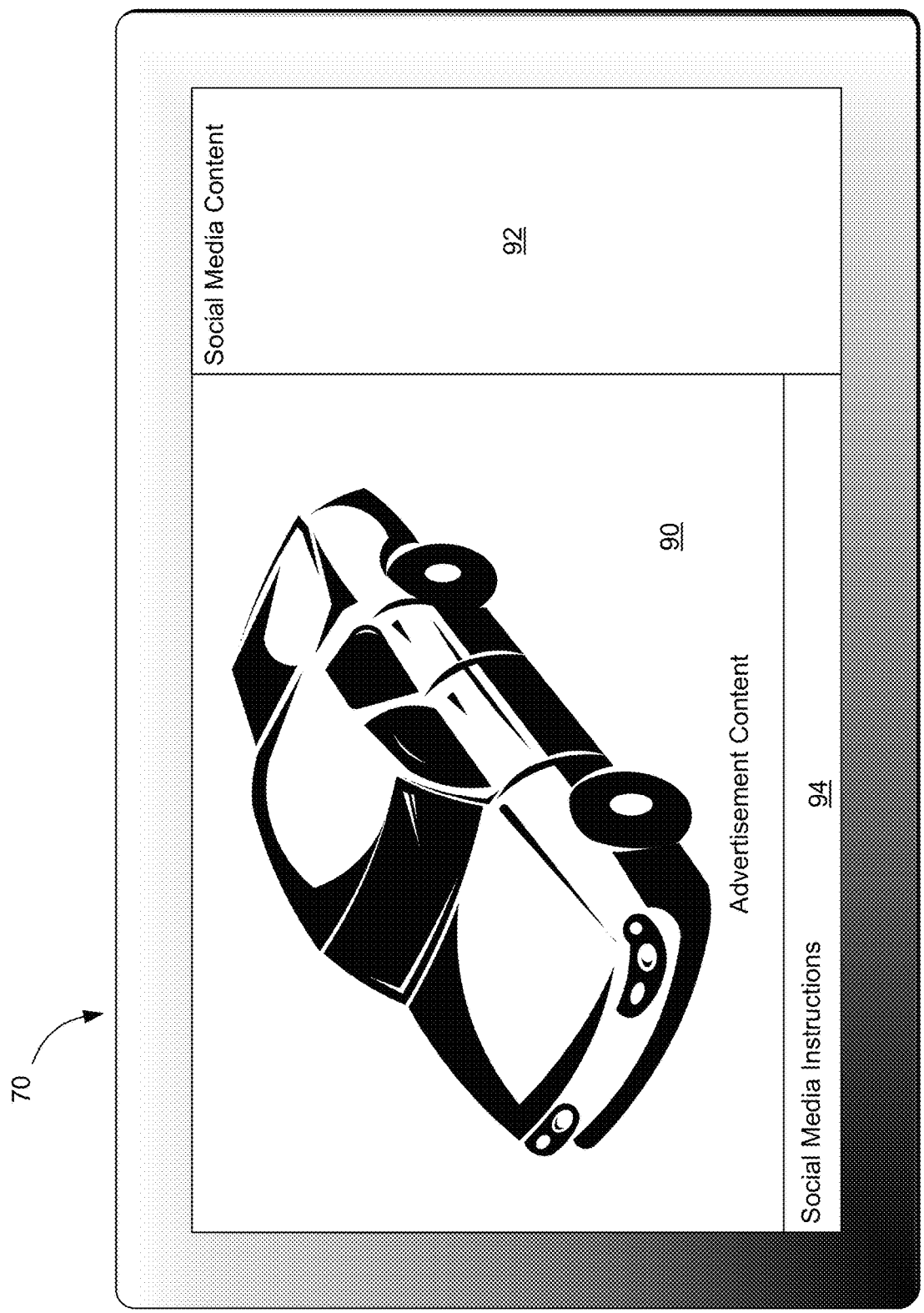
FIG. 5 shows a representative display of an embodiment of an electronic billboard.
Figure 6:
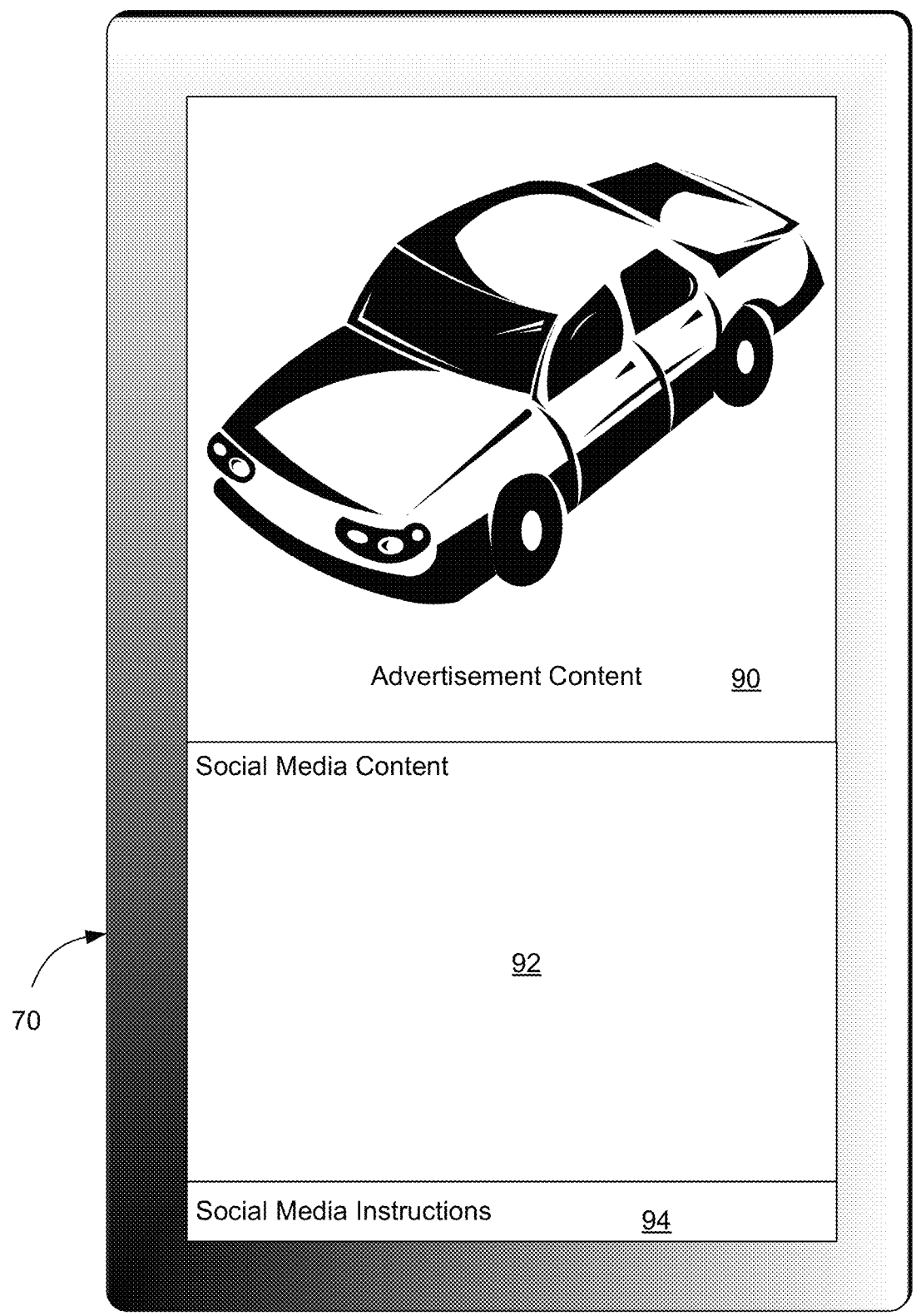
FIG. 6 shows an alternate representative display of an embodiment of an electronic billboard.

A representative division of the electronic billboard 70 into differing content areas is shown in FIG. 5, where the electronic billboard 70 has a generally horizontal orientation, and in FIG. 6, where the electronic billboard 70 has a generally vertical orientation. In these examples, the electronically modifiable area of the electronic billboard 70 is divided into three content areas. Advertisement content is displayed in an advertisement content area 90. The advertisement content displayed in the advertisement content area 90 may include any visual content, including static, motion, and video content. In the illustrated example, the advertisement content area 90 occupies a majority of the display area of the electronic billboard 70, but in other examples, the advertisement content area 90 may vary in size between only a small portion of the display area and all or nearly all of the display area.

In the example shown in FIG. 5, relevant social media is displayed in a social media content area 92. In this example, the social media content area 92 is displayed to the right of the advertisement content area 90, but it could equally be displayed to the left of the advertisement content area 90, above the content area 90, or below the content area 90, as in FIG. 6. In some instances, more than one social media content area 92 may be provided and displayed at any desired location or locations of the display area. For example, if social media content drawn from multiple social media providers is to be displayed on the electronic billboard 70, social media content from each social media provider may be displayed separately from social media content of other social media providers in a separate social media content area 92. The social media content area 92 or social media content areas 92 can be updated in content, size, and placement as dictated by any of a variety of factors.

For example, the social media content area 92 can be updated with additional content as the additional content becomes available. Additionally, as larger amounts of social media content becomes available, the social media content area 92 may be resized to be larger so as to allow additional social media content to be simultaneously displayed in the social media content area 92. Similarly, if a certain period of time passes since certain social media content became available and was displayed by the electronic billboard 70, the older social media content may be removed from the social media content area 92, and the social media content area 92 may be resized smaller based on smaller amounts of relevant and recent social media content being available. As an extension of this, the social media content area 92 might not be displayed at all times, such as when there is no relevant social media content available or when available relevant social media content is old. As the social media content area 92 is resized, added, or removed, the advertisement content area 90 may also be appropriately resized along with any advertisement displayed therein.

The social media content displayed in the social media content area 92 is retrieved by the electronic billboard provider 74 over the network 38. The electronic billboard provider 74 analyzes the social media content to determine what content is relevant to the electronic billboard 70 and the advertisement(s) being displayed thereon. The electronic billboard provider 74 then delivers relevant social media content over the network 38 to the electronic billboard 70 for display. Alternatively, the local control devices 72 may receive instructions for monitoring social media content of the social media provider 86 over the network 38, analyzing the social media content to recognize relevant social media content, and retrieving relevant social media content from the social media provider 86 over the network 38. Regardless, the relevant social media content can be displayed on the electronic billboards 70 in real time.

By way of example, servers of the electronic billboard provider 74 open connections with one or more social media providers, such as social media provider 86. Representative examples of the social media provider 86 include Twitter, Foursquare, and Instagram. The connection between the server of the electronic billboard provider 74 and the social media provider 86 allows the electronic billboard provider 74 to receive and retrieve social media interactions as they occur. Once the system receives a new social media interaction, the system determines whether the social media interaction relates to one of the electronic billboards 70 of the system.

Social media interactions may relate to the electronic billboards 70 of the system in varying fashions. First, as mentioned above, the electronic billboards 70 of the systems all have specific physical locations. The system may determine that social media interactions that relate to that physical location are therefore related to that electronic billboard 70. Thus, for example, if a user of Foursquare checks in to a location housing one of the electronic billboards 70, the system may determine that the Foursquare check-in is relevant to the social media displayed on that electronic billboard 70. As another example, the electronic billboard itself may be labeled with a location such that Foursquare users can specifically check-in to the electronic billboard 70 as a specific hyper-local location. The system may determine that such check-ins are particularly relevant. The social media interactions (e.g. check-ins) can then be formatted, filtered, routed and displayed on the appropriate electronic billboard 70 or electronic billboards 70.

As another example of social interactions that may relate to the electronic billboards, the owner of a venue may input certain key words into the system that relate to the venue. The system then recognizes when one or more of those keywords is included, for example, in Twitter items as #hashtags, @mentions, or simply as in-tweet text. When the system matches the selected keywords, it recognizes those Twitter social media interactions as being relevant to the electronic billboard 70 located in the venue that input those keywords. The system can then determine whether the social media interaction is suitable for display on the electronic billboard 70 or electronic billboards 70, including by way of evaluating the volume of potentially-matching social media interactions and the closeness of the matches with the keywords.

Similarly, the owner of an advertisement being or to be displayed on the electronic billboards 70 can select certain key words into the system that relate to the advertisement or the advertiser. The system then recognizes when one or more of those keywords is included, for example in Twitter items as #hastags, @mentions, or simply as in-tweet text. When the system matches the selected keywords, it recognizes those Twitter social media interactions as being relevant to the advertiser and/or advertisement. The system can then determine whether the social media interaction is suitable for display on the electronic billboard 70 or electronic billboards 70. This determination may be more limited, in that the system may determine to show such social media interactions only when the respective advertisement is being displayed on the electronic billboard 70. Thus, the system might only display social media interactions that are relevant to an advertisement that is still displayed on the electronic billboard 70.

While the system is configured to retrieve social media interactions that are relevant to the electronic billboard 70 using methods such as those illustrated above, the system may also be configured to permit curating the social media content before or after display, as discussed above. For example, retrieved social media interactions may be filtered for offensive, inappropriate, or inapplicable content and the like before or after the social media interactions are displayed on the electronic billboard 70. Standards and rules set by interested parties (electronic billboard provider 74, venue owners 76, or advertisers 78) may be used to curate the social media interactions. The advertisers 78, for example, may wish to filter social media interactions that are critical of the advertisers 78 or that are posted in support of competitors instead of the advertisers 78. To keep good customer relations with venue owners 76, the electronic billboard provider 74 may establish filtering rules and standards, including standards of decency, offensive language, and the like.

In many instances, venue owners 76 are in the best position to recognize inappropriate content based on the demographics of their customers, and the venue owners 76 can establish rules and standards used to govern the display of content where the electronic billboard 70 is located. For example, if a venue owner recognizes content that is disruptive to patrons, the venue owner can curate the content or ban the display of content from certain users who abuse the system. In some instances, priority may be given to the rules and/or standards established by venue owners 76 in governing the content displayed by electronic billboards 70 in their venues.

The retrieved social media interactions can be curated at any time using a variety of systems and interfaces. For example, advertisers 78 and venue owners 76 can create standards and rules governing the display of retrieved social media interactions in advance using advertiser and venue owner web portals or other interfaces provided by the electronic billboard provider 74. Similarly, the electronic billboard provider 74 can use its own systems to establish standards and rules governing the display of retrieved social media interactions in advance. Regardless of who establishes the rules or standards, such rules or standards may be established, applied, and varied according to any of a variety of criteria and factors, such as time of day, subject matter, location of the electronic billboard 70, advertisement displayed, and the like. Because prior-established rules and standards may not permit perfect filtration of retrieved social media content, social media content displayed on the electronic billboard may be curated after the fact by venue owners 76, advertisers 78, and the electronic billboard provider 74 by similar means (e.g. web portal or other interface) and in real time.

In some instances, the system might continue to display social media interactions relevant to advertisements for a certain period of time after the electronic billboard 70 displaying the advertisement ceases to display that particular advertisement. If the system recognizes a social media interaction relevant to an advertisement that has ended, the system might still receive and store the social media interaction for purposes of analytics, but the social media interaction might never be displayed on the electronic billboard 70.

Thus, for example, an electronic billboard located in a restaurant might begin displaying an advertisement for an energy drink. While the energy drink advertisement is being displayed, the system locates new social media interactions (e.g. on Twitter) about 1) the particular energy drink in the advertisement or the drink manufacturer, and 2) the restaurant. The system then displays these social media interactions on the electronic billboard 70, such as in the social media content area 92. As the advertisement continues, more such social media interactions are located and displayed (older social media interactions may be displaced or removed as necessary).

After a time, the energy drink advertisement might be replaced by an advertisement for a clothing company. Because the social media interactions about the energy drink manufacturer do not relate to the new advertisement, the system may remove such social media interactions from the electronic billboard 70 as the advertisement is changed or shortly thereafter. In contrast, social media interactions relating to the venue (e.g. selected based on keywords input by the venue owner), not the particular advertisement (e.g. selected based on keywords input by the advertiser), might be considered to have continuing relevance, and such venue-related social media interactions may remain displayed on the electronic billboard 70.

Some social media interactions may be selected and displayed based on both advertiser and venue-specific information. For example, Instagram users may create a social interaction with keywords that could match either the advertiser keywords or the venue keywords. Additionally, such users' social interactions could be associated with the venue based on Foursquare venue IDs and/or by way of geographic coordinates associated with where the Instagram social interaction was taken (i.e. matching the geographic coordinates of the venue). Such social media interactions can be handled similarly to those above, and the system may analyze each social media interaction to determine when to display, when to remove, and when to ignore each social media interactions based on the characteristics of each social media interaction.

In some instances, either the advertiser or the venue owner will wish to ensure that viewers of the electronic billboard 70 and its associated advertisements are able to know how to create social media interactions that will be displayed as social media content on the electronic billboard 70. Thus, the electronic billboard 70 may dedicate a portion of the display as a social media instructions area 94, as shown in FIGS. 5 and 6. The social media instructions are 94 may be any size, may be located anywhere on the display, and may also be shown, removed, enlarged, shrunk, etc., as was discussed above with respect to the social media content area 92.

The social media instructions area 94 allows the electronic billboard 70 to display information to viewers of the electronic billboard 70 relating to how to post social media interactions that will qualify for display on the electronic billboard. For example, the social media instructions area 94 may display one or more of the keywords selected by the advertiser and/or the venue owner with encouragement to post social media interactions containing those keywords. As the viewers then post such social media interactions, those interactions may then appear in the social media content area 92, making the electronic billboard 70 interactive.

The posts and content displayed on the electronic billboards 70 may include any type of textual, audio, or visual information. For example, Instagram interactions typically include photographs, and such photographs may be displayed on the electronic billboards 70. These interactions need not be limited to any particular area of the display, but can be transiently displayed on the entire display and then displayed in smaller form within a specific content area. Thus, the electronic billboard displays need not be limited solely to textual information.

Because the electronic billboard provider 74 knows what is displayed on each electronic billboard 70 at any given time, the electronic billboard provider 74 is able to intelligently route and display social media interactions on the various electronic billboard. Thus, for example, social media interactions with respect to an advertisement displayed at one venue or location will generally not correlate with electronic billboards 70 in other locations because dissimilar advertisements will often be shown on the respective electronic billboards 70. Where similar (or the same) advertisements are shown on different electronic billboards, they are often separated in time, such that the posting time of social media interactions serves to distinguish the associated location of each social media interaction so the electronic billboard provider can appropriately route the social media interaction for display. Furthermore, the keywords or other identifying information associated with each venue may differ, such that social media interactions dealing with even identical advertisements at different locations will sufficiently differ so the electronic billboard provider 74 can appropriately route each one for display.

Thus, the viewers of the electronic billboards 70 will find the electronic billboards 70 to be an interactive experience, not only with the electronic billboard 70 itself, but also with other viewers of the electronic billboard 70. If an electronic billboard 70 is located in a busy location with many viewers, one of those viewers might post a social media interaction related to the electronic billboard 70 that is retrieved and displayed on the electronic billboard 70 in real time or near real time. Another viewer in the same location could then view the social media content and could create his or her own interaction, including an interaction with a different social media provider, that would also be retrieved and displayed on the electronic billboard 70 in real time or near real time. Other viewers could similarly join in the experience, creating a social media interaction with the advertisement, with the venue, and with the patrons located in the venue.

The social media interactions displayed in the social media content area 92 need not be limited to viewers of the electronic billboard 70. For example, all tweets posted to the advertiser's or to the advertisement's Twitter feed during the time the advertisement is displayed may be displayed in the social media content area 92. While viewers would still be able to see their own posts displayed, they could also see any posts made by other users worldwide. An advertiser could create an advertisement-specific social media account or keywords, and the advertisement could be simultaneously displayed in multiple venues. Multi-venue conversations and social interactions could then occur while viewers of the advertisement in multiple venues interact with the advertisement and with each other while the advertisement is displayed.

Furthermore, interaction need not be limited to interaction between the advertisement and viewers of the advertisement through the electronic billboard 70. According to embodiments of the invention, advertisers may choose to enable advertiser interactions with their advertisements and with the viewers of the advertisement. For example, an advertiser may interact with the advertisement and with viewers of the advertisement, effectively having a conversation with the viewers through the electronic billboard and in real time.

Thus, when a viewer interacts with the advertisement and posts a relevant social media interaction, the advertiser or its representative can view the social media interaction essentially as it is posted to the electronic billboard 70. The advertiser can then post an interaction in response. The advertiser post can be posted through the same social media provider, or the advertiser can post directly through an access portal provided by the electronic billboard provider 74. Such interaction could represent good customer relations between the advertiser and viewers of the advertisement.

To illustrate the process, an advertiser might create an advertisement featuring a particular celebrity. The advertiser could then use the auctioning process discussed above to schedule display of the advertisement at a desired time in one or more venues. The advertiser could then arrange with the celebrity to be available to respond to social media interactions with the advertisement through the electronic billboard system. When the advertisement is displayed at the venue or venues on the electronic billboard 70 or electronic billboards 70, viewers might interact with the ad as described above. The viewers might then be surprised and excited to find the celebrity responding, in real time, to their social media interactions where they and their friends can see it. Such an interaction could occur simultaneously across multiple venues, or it could occur serially as the advertisement is displayed at different times in different venues. For example, the experience could be replicated at multiple individual venues with relatively little time investment by the celebrity. If, for example, each advertisement is displayed for five minutes, personalized interaction with the celebrity could be provided at as many as twenty venues in only an hour, which could be in very distant or different locations. Additionally, the various interactions could be preserved on a social media page controlled by the advertiser, so participants and others could view the interaction for further advertising impressions.

Thus, embodiments of the invention enable new mechanisms for advertiser interactions with potential customers. These embodiments facilitate the integration of social media with advertisements, venues, customers, and viewers of the advertisements. As may be appreciated, the impact of advertisements increases as they become interactive to the user. Advertisers are able to better target their advertisements to target audiences at known venues. For example, the electronic billboard provider 74 may maintain analytics about the audiences likely to be at particular venues at particular times. The electronic billboard provider 74 is able to do this both by analysis of past interactions with the system, as well as through information obtained from the various venue owners. Such information can be provided to the advertiser at the time of scheduling and/or bidding for placement of the advertisements.

The analytics maintained by the electronic billboard provider 74 can be collected and used over time, and can also be collected and used immediately in real time. Advertisers may be provided with analytics regarding the number of people that have interacted with certain types of advertisements at certain times in certain venues, as well as analytics specific to the advertiser's advertisements. The analytics can be provided after the fact and in aggregate, or they may be accessed by the advertiser in real time. Advertisers may also be provided information regarding the specific content of the social media interactions, as the electronic billboard provider 74 may maintain a history of the social media interactions transmitted for display by the electronic billboards 70. Venue owners may obtain similar analytics, including demographics of their customers and venues.

The analytics need not be limited to the social media interactions received or obtained by the electronic billboard system. In some embodiments, the electronic billboards 70 may be provided with one or more camera systems that permit analysis of when viewers are actually looking at the display of the electronic billboard 70. The system can therefore identify when the screen has been viewed and can potentially mark an advertisement as having "run" at the moment that a real-life person looks directly at it. In this fashion, the system can potentially recognize (and bill for) real-life impressions in real time just as web advertising networks charge per digital website view/impression. Additionally, when the system recognizes that an individual is looking at the screen, the system can deepen the viewer's interaction, such as by flashing a message to encourage the viewer to use a mobile device to interact with the system as described above.

Interaction with the electronic billboards 70 need not be unidirectional. Instead, the system may interact in a bidirectional manner with the viewers of the electronic billboards 70. Thus, as a viewer uses his or her mobile device 80 and social media account to interact with the electronic billboard, the system may reward the viewer. Rewards may be provided in any desirable fashion, including by way of delivering items of value to the viewer through the viewer's social media account and/or mobile device 80. For example, the viewer might be rewarded by the venue owner 76 with a coupon redeemable for a discount on the viewer's meal at the venue where the electronic billboard 70 is located, or for a discount on a future meal at the venue. As another example, the viewer might be rewarded by the advertiser 78 with a coupon redeemable for a discount on goods or services provided by the advertiser 78. Any desirable reward may be provided to incentivize viewer interaction with the electronic billboard 70 and the advertisements displayed thereon. Rewards may be provided by the venue owner 76, the advertiser 78, the electronic billboard provider 74, or the social media provider 86, as desired.

Interaction with the system engages real-world viewers in unprecedented ways, as the electronic billboards 70 become the focus of attention and a gathering place in any venue. The electronic billboards 70 may serve a function for businesses similar to the function served by jukeboxes in the past, enhancing the aura of the location and helping everyone have a good time. To further the interaction of the user with the system, the interaction may extend beyond the social media content area 92 to include interaction with the advertisement content area 90. Such interaction may be provided by interactive applications or apps that may be selected by either advertisers or venue owners.

Some interactive applications may serve as advertisements themselves. In such instances, the on-screen advertising becomes an interactive experience. For example, advertisements may be developed that allow viewers to interact with and change the advertisements like a video game in return for an incentive, such as a discount on the goods being advertised. The system may also track long-term user involvement across the system, allowing users to build up their identity and gain levels, and rewarding users for their interactions in a venue with for example, additional virtual rewards. The electronic billboard 70 serves as the channel for interactivity, and the system is able to identify the individual performing the real-life interaction so that the discount or other incentive can be delivered to the individual. The identification can occur through the social media interactions or by any other mechanism.

Other interactive applications may come with monetary or product-oriented incentives, like a free drink or a discount on goods if certain interaction criteria set by the venue are met. For example, an application might track the number of Foursquare check-ins and/or specific Twitter interactions occurring over the course of an hour. If ten or more customers interact with the system in the way or ways specified by the venue, the venue could give everyone then in the venue a free soda. The venue owner may choose to have the interactive application shown on the electronic billboard 70 periodically so that customers can see the number of people needed to interact before everyone wins. Customers would then be motivated to urge others around them to complete the remaining interactions.

In these ways, interactive applications aggregate digital social interactions from customers in the venue. The customers are connected on a digital level and are aligned toward a common goal. The encouraged interactions turn to benefit the advertiser and/or venue, as the social media presence of the advertiser and/or venue is enhanced through the social media interactions of the customers with the system.

Interactive applications are delivered to the electronic billboards 70 using the same real-time channels as advertisements, venue content, social media interactions, and other content. The interactive applications are then executed for the duration scheduled by the individual who chose the application, usually either the venue owner or an advertiser. During the time of execution of the interactive applications, venue owners and/or advertisers may have access to one or more local or remote application programming interfaces (APIs) provided by the electronic billboard provider 74. The system differs from a traditional smartphone system in that new applications are pushed to the electronic billboards 70 to be run for a short duration of time as opposed to most smartphone apps, which remain on the smart phone until removed by the user. After the scheduled run time has passed, the applications may expire to reduce the resource load at the electronic billboards 70 and to reduce conflicts with future applications or other software to be run on the electronic billboards 70.

In this way, the electronic billboards 70 function as a transient thin client, because they depend on the network to fulfill their designed functionality. The electronic billboards 70 differ from traditional thin clients because the entire interactive software package is temporarily pushed onto the device to perform its role rather than be operated remotely. This eases the computing resource requirements at the electronic billboards 70 and local control devices 72, which do not need to have enough storage for a full library of applications.

The electronic billboard provider 74 is able to build up a library of third party applications in an app store without having to periodically push updates to every device and have the devices upgrade their software packages. Instead, because the applications are pushed to the electronic billboards 70 immediately prior to use, the electronic billboards 70 always have the latest version of any installed application.

The electronic billboard provider 74 may provide software development kits (SDKs) for third party developers to create applications to run independently on the electronic billboards 70. The developed software is delivered in real time using the same mechanisms as social interactions, advertisements, and other content. App developers have multiple APIs to utilize when developing their applications, including access to the electronic billboard's social stream, the venue information (e.g. demographics, geo-coordinates, traffic data), mechanisms to display content on-screen, core advertising APIs, any open content libraries (stock imagery, icons, etc.), among other tools. Developers can use these tools to create compelling interactive user experiences and unique ways to develop content on-screen. Developers using the SDK are given the opportunity to have their applications instantly deployed to thousands of electronic billboard locations.

Venue owners and advertisers need not create their own applications. Instead, applications and template applications created by the electronic billboard provider 74 and applications and template applications created by third parties may be made available to owners and advertisers on an application marketplace. The owners and advertisers may be allowed to modify selected or purchased applications and/or templates. The owners and advertisers can then schedule applications to be run during times they have purchased screen time, in the case of advertisers, or during times they are allotted screen time, in the case of venue owners. Applications are delivered in real time to the electronic billboards 70 as discussed above, so applications can be changed, modified, or improved instantaneously. Advertisers and venue owners are able to interact with the system using portals provided by the electronic billboard provider 74, such as by accessing the portal through a browser over the network 38.

Venue owners and advertisers may be provided with portal controls over the content displayed on the electronic billboards 70. For example, the venue owner may use its portal not only to schedule certain applications, but to also to limit certain types of advertisements at certain times, as discussed above. Additionally, both venue owners and advertisers may be provided with real-time simulation of the display of the electronic billboards 70, as discussed above, and may be given opportunities to modify the display as appropriate. For example, venue owners or advertisers may be allowed to delete some social media interactions displayed on the screen, such as offensive or off-topic social media interactions. The deletion or other modification of the display can be performed in real time. Further controls may allow the venue owner or advertiser to ban or temporarily ban posts from certain users that have been problematic. Further controls may allow the venue owner or advertiser to post to the electronic billboards 70 without being posted on a relevant social media website.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A non-transitory computer-readable medium storing computer program code to execute a method for dynamically determining relevant social media to display with an advertisement on an electronic billboard in a networked system comprising the electronic billboard, a server operatively connected to a plurality of social media sources, and a web portal operatively connected to the server and the electronic billboard, the method comprising:

receiving, at the server, an advertisement from an advertisement owner along with key words relating to the advertisement;

delivering the advertisement from the server to an electronic billboard for display in an advertisement content area of the electronic billboard during a scheduled display period;

monitoring, by the server, the plurality of social media sources for social media content containing the key words and thus relevant to the advertisement currently on display by the electronic billboard by establishing connections with the plurality of social media sources and monitoring content of the social media sources for the key words;

selecting and retrieving, by the server, from among the monitored social media sources relevant content from social media postings on the social media sources containing one or more of the key words for the currently displayed advertisement as the social media postings occur;

pushing delivery, by the server, of an interactive application configured to display to the electronic billboard;

causing the interactive application to be displayed by the electronic billboard;

delivering the retrieved social media content relevant to the advertisement containing the one or more of the key words from the server to the interactive application of the electronic billboard in real time for display in a social media content area of the electronic billboard during the display period;

displaying viewer interactions with the interactive application in the social media content area of the electronic billboard;

providing the web portal, by the server, to the advertisement owner and to an owner of a location of the electronic billboard, whereby both the advertisement owner and the owner of the location of the electronic billboard input standards and rules governing display of relevant content;

curating and blocking display of certain of the social media content relevant to the advertisement containing one or more of the key words according to the standards and rules received from both the advertisement owner and the owner of the location of electronic billboard, and updating the displayed social media content containing one or more of the key words and thus relevant to the advertisement periodically throughout the display period; and displaying the delivered social media content concurrently with the relevant advertisement.

2. A non-transitory computer-readable medium as recited in claim 1, wherein the method further comprises providing an advertiser with an option to bid on the display period in which the advertisement is displayed using an electronic interface provided by an electronic billboard provider.

3. The non-transitory computer-readable medium as recited in claim 1, further comprising displaying advertiser responses to displayed social media posts as an advertiser conversation with the content.

4. The non-transitory computer-readable medium as recited in claim 1, further comprising:

ceasing display of the interactive application after the display period has ended; and removing the interactive application from the electronic billboard, whereby storage of the electronic billboard is made available for an additional interactive application.

5. The non-transitory computer-readable medium recited in claim 1, wherein curating and not displaying certain social media content relevant to the advertisement, and updating the social media content relevant to the advertisement periodically throughout the display period comprises an action selected from the group consisting of:

filtering and not displaying social media content that is critical of an advertiser;

filtering and not displaying social media content that is supportive of competitors of the advertiser;

filtering and not displaying social media content that does not comply with standards of decency or offensive language set by the advertiser;

filtering and not displaying social media content that does not comply with standards of decency or offensive language set by a venue owner of a venue where the electronic billboard is located;

filtering and not displaying social media content that does not comply with a time of day criteria;

filtering and not displaying social media content that does not comply with a subject matter criteria;

filtering and not displaying social media content that does not comply with an electronic billboard location criteria; and filtering and not displaying social media content that does not comply with a displayed advertisement criteria.

6. The non-transitory computer-readable medium recited in claim 1, wherein the web portal permits the advertisement owner and the owner of the location of the electronic billboard to input standards and rules governing display of retrieved social media postings both in advance of display of the advertisement and relevant social media content and in real time after display of any unwanted social media content.

* * * * *